United States Patent
Qi et al.

(10) Patent No.: US 10,520,114 B2
(45) Date of Patent: Dec. 31, 2019

(54) PIPE CLAMPING DEVICE AND A PIPE ASSEMBLY

(71) Applicant: Ford Global Technologies LLC, Dearborn, MI (US)

(72) Inventors: Seven Qi, Nanjing (CN); Kelly Chen, Nanjing (CN); Fiona Zhang, Nanjing (CN); Sunny Li, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 90 days.

(21) Appl. No.: 15/969,585

(22) Filed: May 2, 2018

(65) Prior Publication Data
US 2018/0335167 A1    Nov. 22, 2018

(30) Foreign Application Priority Data
May 16, 2017   (CN) .......................... 2017 1 0343930

(51) Int. Cl.
| | |
|---|---|
| *F16L 3/237* | (2006.01) |
| *F16L 3/12* | (2006.01) |
| *F16L 3/08* | (2006.01) |
| *F16B 1/00* | (2006.01) |
| *F16B 17/00* | (2006.01) |
| *F16L 3/137* | (2006.01) |

(52) U.S. Cl.
CPC ................ *F16L 3/237* (2013.01); *F16B 1/00* (2013.01); *F16B 17/008* (2013.01); *F16L 3/085* (2013.01); *F16L 3/1211* (2013.01); *F16L 3/1222* (2013.01); *F16L 3/137* (2013.01)

(58) Field of Classification Search
CPC ......... F16L 3/237; F16L 3/085; F16L 3/1211; F16L 3/1222

USPC .......................................................... 138/106
See application file for complete search history.

(56) References Cited

U.S. PATENT DOCUMENTS 2,396,925 A * 3/1946 Morehouse ............. F16L 3/223
                                                         248/68.1
2,413,772 A * 1/1947 Morehouse ........... F16L 3/1233
                                                          24/457

(Continued)

FOREIGN PATENT DOCUMENTS

| CN | 303948083 S | 11/2016 |
| CN | 303948086 S | 11/2016 |

(Continued)

OTHER PUBLICATIONS http://www.lsbilletworks.com/fuelline-clamp_install2.html.

*Primary Examiner* — Craig M Schneider
*Assistant Examiner* — David R Deal
(74) *Attorney, Agent, or Firm* — Geoffrey Brumbaugh Kolitch Romano LLP

(57) ABSTRACT

A pipe clamping device comprises a first part including a first base and a first clamping portion connected to the first base; a second part including a second base and a second clamping portion connected to the second base; and a connector including a rod. The first base includes a first guiding slot extending in a first direction and the second base includes a second guiding slot extending in the first direction. The rod of the connector passes through the first guiding slot and the second guiding slot at a second direction different from the first direction. The first clamping portion is movable relative to the second clamping portion in the first and second directions.

20 Claims, 7 Drawing Sheets

(56) References Cited

U.S. PATENT DOCUMENTS

| | | | | |
|---|---|---|---|---|
| 3,068,924 A | * | 12/1962 | Summers | F16B 37/044 |
| | | | | 411/113 |
| 3,136,515 A | * | 6/1964 | Potruch | F16L 3/13 |
| | | | | 248/62 |
| 3,182,939 A | * | 5/1965 | Seckerson | F16B 21/20 |
| | | | | 248/73 |
| 3,563,131 A | * | 2/1971 | Ridley, Sr. | F16B 35/04 |
| | | | | 411/384 |
| 5,738,384 A | | 4/1998 | Boehme | |
| 6,505,796 B1 | * | 1/2003 | Roth | F16L 3/133 |
| | | | | 248/62 |
| 7,478,783 B2 | * | 1/2009 | Royer | F16L 3/223 |
| | | | | 248/49 |
| 7,802,761 B2 | | 9/2010 | Volchko | |
| 8,559,782 B2 | * | 10/2013 | Cleofe | H02G 3/30 |
| | | | | 24/16 PB |
| 8,944,388 B2 | * | 2/2015 | Magno, Jr. | F16L 33/24 |
| | | | | 248/56 |
| 9,648,993 B2 | * | 5/2017 | Gainey | A47K 10/04 |
| 10,132,429 B2 | * | 11/2018 | Grieb | F02C 7/222 |
| 2016/0178090 A1 | | 6/2016 | Schilling | |

FOREIGN PATENT DOCUMENTS

| | | |
|---|---|---|
| CN | 303995912 S | 1/2017 |
| FR | 2952992 B1 | 2/2012 |

\* cited by examiner

US 10,520,114 B2

PIPE CLAMPING DEVICE AND A PIPE ASSEMBLY

RELATED APPLICATION

This application claims the benefit of Chinese Patent Application No.: CN 201710343930.0 filed on May 16, 2017, the entire contents thereof being incorporated herein by reference.

FIELD

The present disclosure relates to a pipe clamping device and a pipe assembly which allow certain movement between two pipes.

BACKGROUND

In some systems having pipes such as an engine system, a static gap should be maintained between two pipes to avoid interference when an engine operates. Because there are many parts around the engine, vehicle tests are required to determine the gap. Conventional clamping devices can fix two pipes together and maintain a certain gap. However, the pipes or the parts connecting the pipes may be worn easily if the two pipes are fixed together and cannot move when a force caused by a motion from the engine applies onto the pipes. Thus, there is a need to develop a clamping device to maintain a gap between two pipes while allow certain movement.

BRIEF DESCRIPTION

According to one aspect of the present disclosure, a pipe clamping device comprises a first part including a first base and a first clamping portion connected to the first base; a second part including a second base and a second clamping portion connected to the second base; and a connector to connect the first part and the second part. The first base includes a first guiding slot extending in a first direction and the second base includes a second guiding slot extending in the first direction. The connector includes a rod passing through the first guiding slot and the second guiding slot at a second direction different from the first direction. The first clamping portion is movable relative to the second clamping portion in the first and second directions.

In one embodiment, the first base further includes a first locking pin extending from a main surface of the first base in the second direction and the second base further includes a third guiding slot to receive the first locking pin and the third guiding slot is substantially parallel to the second guiding slot.

In another embodiment, the first base includes a first connecting end to the first clamping portion and a first distal end opposed to the first connecting end, and the first distal end further includes a first supporting surface. The first guiding slot is positioned between the first connecting end and the first supporting surface, and the first locking pin is adjacent to the first distal end. The first direction is substantially perpendicular to the second direction.

In another embodiment, the second base includes a second connecting end to the second clamping portion and a second distal end opposed to the second connecting end. The second distal end of the second base further includes a second supporting surface. The second guiding slot and the third guiding slot are positioned between the second distal end and the second connecting end.

In another embodiment, the first supporting surface and the second supporting surface are concaved to accommodate an outer surface of a first pipe and a second pipe to be connected.

In another embodiment, the connector further includes a first stop and a second stop located at two ends of the rod, and the first part and the second part are disposed between the first stop and the second stop.

In another embodiment, a length of the rod is greater than a sum of a thickness of the first base and a thickness of the second base in the second direction such that the first part is movable relative to the second part in the second direction.

In another embodiment, the connector includes a blot and a screw.

In another embodiment, the first base of the first part further includes a fourth guiding slot extending in the first direction, and the second base of the second part further includes a second locking pin extending from a main surface of the second base in the second direction. The second locking pin is slidable in the fourth guiding slot, and the second locking pin is adjacent to the second distal end of the second base.

In another embodiment, the fourth guiding slot and the first locking pin are disposed at two sides of the first guiding slot, respectively, and the third guiding slot and the second locking pin are disposed at two sides of the second guiding slot, respectively.

In another embodiment, the first clamping portion is integrally formed with the first base and includes a first arm and a second arm opposed to the first arm. The first arm and the second arm form a first receiving space to receive a first pipe. The second clamping portion is integrally formed with the second base and includes a third arm and a fourth arm opposed to the third arm. The third arm and the fourth arm form a second receiving space to receive a second pipe.

In another embodiment, an end of the first arm includes a first snap ring, and the second arm includes a plurality of first groove. The second arm passes through the first snap ring such that a size of the first receiving space may be adjusted via an engagement between the first snap ring and one of the plurality of first grooves.

In another embodiment, the first clamping portion is connected to the first portion via a pivotal structure such that the first clamping portion is rotatable relative to the first base in a third direction around a first axis parallel to the first direction. The second clamping portion is connected to the second portion via a pivotal structure such that the second clamping portion is rotatable relative to the second base in the third direction around a second axis parallel to the first direction.

According to another aspect of the present disclosure, a pipe clamping device comprises a first part including a first base and a first clamping portion connected to the first base and configured to receive a first pipe; a second part including a second base and a second clamping portion connected to the second base and configured to receive a second pipe; and a connector including a rod and a first stop and a second stop that are disposed at two ends of the rod. The first base includes a first guiding slot extending in a first direction and a first locking pin extending from a main surface of the first base in a second direction substantially perpendicular to the first direction. The second base includes a second guiding slot extending in the first direction and a third guiding slot to slidably receive the first locking pin. The first locking pin is adjacent to a first distal end of the first base. The first and second and third guiding slots are substantial parallel each other. The first clamping portion and the second clamping portion are spaced apart from each other at the first direction, the first base and the second base are at least partially overlapped, and the rod of the connector is positioned in the first guiding slot and the second guiding slot. A length of the rod defines a maximum distance between the first clamping portion and the second clamping portion in the second direction.

In one embodiment, the first base further includes a fourth guiding slot extending in the first direction, the second base further includes a second locking pin extending in the second direction. The second locking pin is adjacent to a second distal end of the second base and slidably received in the fourth receiving slot.

In another embodiment, a plane in which the first base lies is parallel to or overlapped with a plane in which the first clamping portion lies, and a plane in which the second base lies is parallel to or overlapped with a plane in which the second clamping portion lies. Each of the first part and the second part is integrally formed as one piece.

In another embodiment, the first clamping portion is connected to the first base via a first pivotal structure such that a plane in which the first clamping portion lies has a first angle relative to a plane in which the first base via pivotal movement, and the second clamping portion is connected to the second base via a second pivotal structure such that a plane in which the second clamping portion lies has a second angle relative to a plane in which the second base via pivotal movement.

According to another aspect, a pipe assembly comprises a first pipe; a second pipe; and a clamping device to connect the first pipe with the second pipe. The clamping device comprises a first part including a first base having a first connecting end and a first distal end and a first clamping portion connected to the first connecting end to receive the first pipe; a second part including a second base having a second connecting end and a second distal end, and a second clamping portion connected to the connecting end of the second base to receive the second pipe; and a connector to connect the first part with the second part. The first base includes a first guiding slot extending in a first direction and a first locking pin extending from a main surface of the first base in a second direction different from the first direction and adjacent to the distal end of the first base. The second base includes a second guiding slot extending in the first direction and a third guiding slot to slidably receive the first locking pin and configured to pass through the first guiding slot and the second guiding slot. The connector includes a rod, a first stop and a second stop that are disposed at two ends of the rod. The first part and the second part are movable along the rod to enable movement of the first pipe relative to the second pipe in the second direction, and movement of the first locking pin in the third guiding slot enables movement of the first pipe relative to the second pipe in the first direction.

In one embodiment, the first base further includes a fourth guiding slot extending in the first direction, the second base further includes a second locking pin extending in the second direction. The second locking pin is adjacent to the second distal end of the second base and slidably received in the fourth guiding slot. The first direction is substantial perpendicular to the second direction.

In another embodiment, the first distal end of the first base includes a first supporting surface concaved to accommodate an outer surface of the second pipe, and the second distal end of the second base includes a second supporting surface concaved to accommodate an outer surface of the first pipe.

One or more advantageous features as described herein are believed to be readily apparent from the following detailed description of one or more embodiments when taken in connection with the accompanying drawings.

BRIEF DESCRIPTION OF DRAWINGS

Example embodiments will be more clearly understood from the following brief description taken in conjunction with the accompanying drawings. The accompanying drawings represent non-limiting, example embodiments as described herein.

Figure 1:
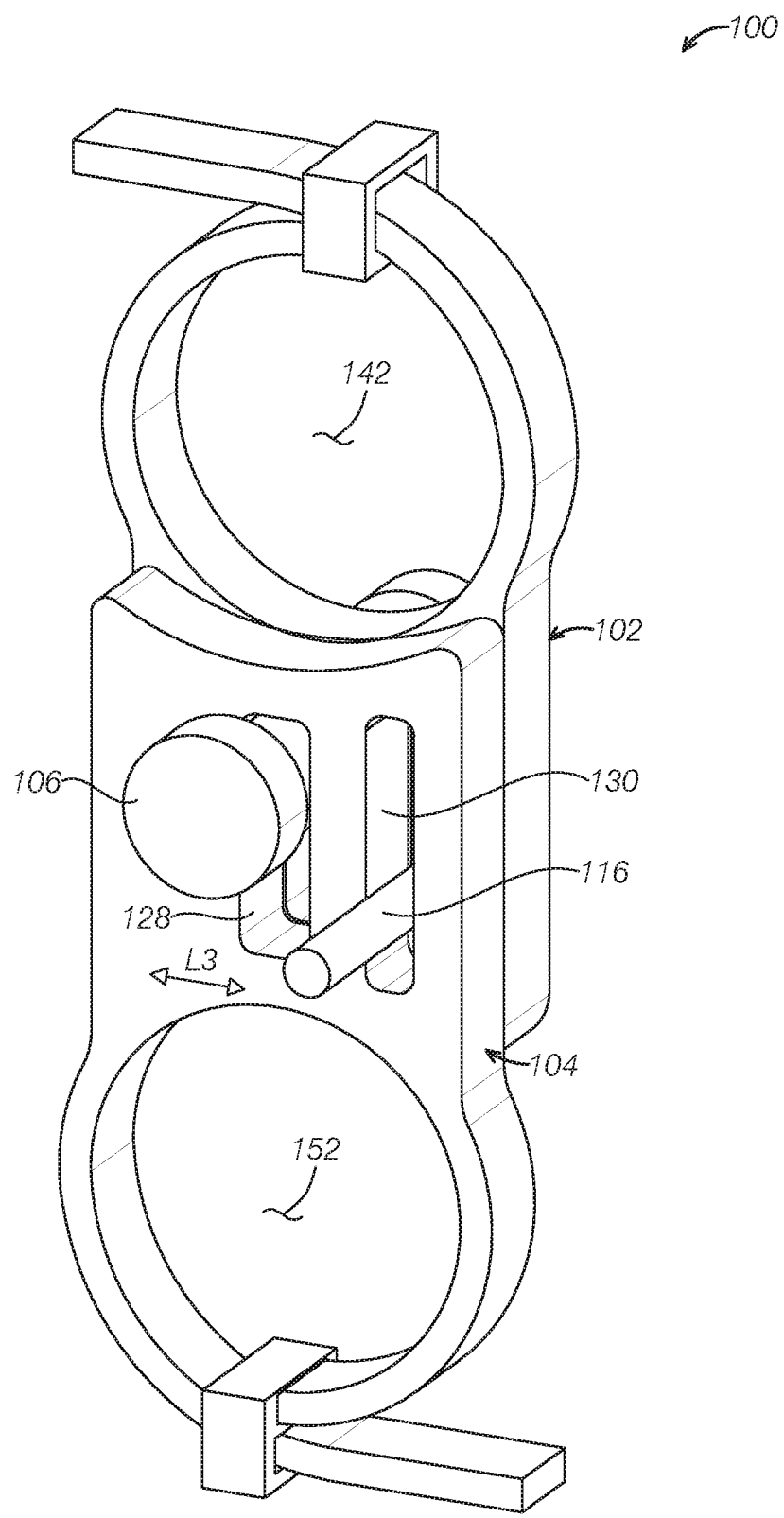
FIG. 1 depicts a perspective view of a pipe clamping device according to one or more embodiments of the present disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

As referenced in the figures, the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

Figure 2:
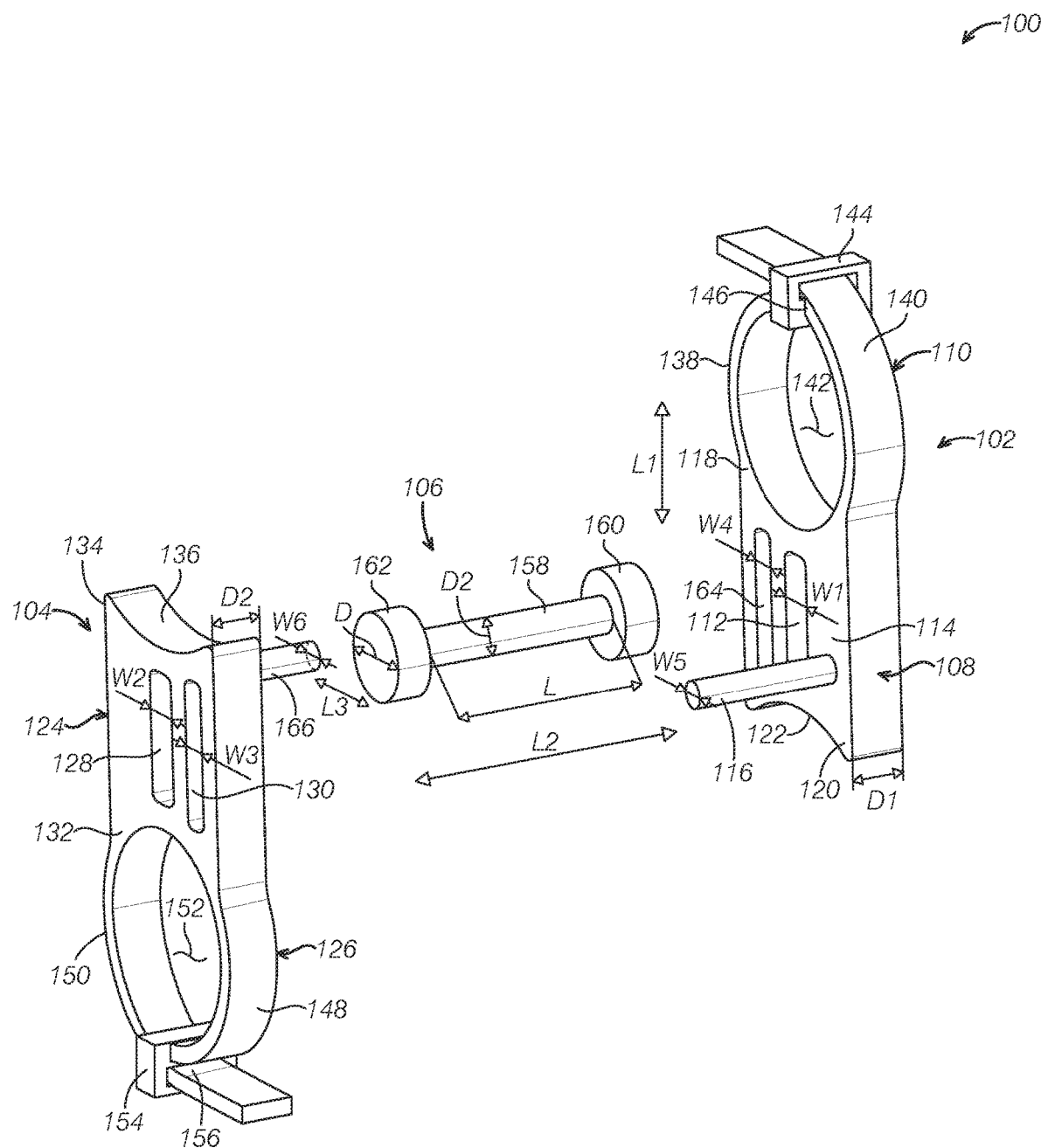
FIG. 2 depicts an exploded perspective view of the pipe clamping device in the FIG. 1.

Referring to FIGS. 1 and 2, FIG. 1 depicts a perspective view of a pipe clamping device 100 according to one or more embodiments of the present disclosure and FIG. 2 depicts an exploded perspective view of the pipe clamping device 100. In one or more embodiments, the pipe clamping device 100 may be used in a vehicle, such as used to hold the pipes in an engine bay. There are many pipes around the engine, such as a fuel pipe, a coolant pipe, a brake fluid pipe, and an air conditioner pipe. A gap or a distance among the pipes is needed to avoid the interference between pipes. Due to the vibration of an engine during vehicle driving, movements between pipes at a certain degree are desired to reduce stress. The pipe clamping device 100 is configured to maintain a certain distance between the pipes while also allow the pipes to move relatively.

Continuing to refer to FIGS. 1 and 2, the pipe clamping device 100 includes a first part 102, a second part 104 and a connector 106 to connect the first part 102 and the second part 104. The first part 102 includes a first base 108 and a first clamping portion 110 connected the first base 108. The first base 108 includes a first connecting end 118 and a first distal end 120 opposed to the first connecting end 118. In one or more embodiments, the first distal end 120 includes a first supporting surface 122 opposed to the first connection end 118 or the first clamping portion 110. The first base 108 further includes a first guiding slot 112 extending in a first direction L1. The first guiding slot 112 is positioned between the first clamping portion 110 and the first supporting surface. In other words, the first guiding slot 112 is positioned between the first connecting end 118 and the second distal end 120. In one or more embodiments, the first direction L1 may be substantial parallel to a main surface 114 of the first base 108 or the first direction L1 is a lengthwise direction of the first base 108. The first base 108 further includes a first locking pin 116 extending from the main surface 114 in a second direction L2 different from the first direction L1. In one or more embodiments, the second direction L2 may be substantial perpendicular to the main surface 114 of the first base 108, or substantial perpendicular to the first direction L1. In one or more embodiments, the term of substantial perpendicular refers to an angle between the first direction L1 and the second direction L2 being from 85 degrees to 95 degrees, in one or more embodiments, the first locking pin 116 is adjacent to the first distal end 120 of the first base 108.

In one or more embodiments, the second part 104 includes a second base and a second clamping portion 126 connected to the second base 124. In one or more embodiments, the second base 124 further includes a second connecting end 132 and a second distal end 124 opposed to the connecting end 132. Further, the second base 124 includes a second guiding slot 128 positioned between the second connecting end 132 and the second distal end 134 and extended in the first direction L1. At a mounting position, the first guiding slot 112 of the first part 102 and the second guiding slot 128 of the second part 104 may be substantially overlapped. The size of the first guiding slot 112 and the second guiding slot 128 may be configured to receive a portion of the connector 106 and allow the connector 106 to slide in the first guiding slot 112 and the second guiding slot 128. The second base 124 further includes a third guiding slot 130 substantial parallel to the second guiding slot 128 to receive the first locking pin 116 on the first base 108 and allow the first locking pin 116 to freely slide or move in the third guiding slot 130. In one or more embodiments, the first guiding slot 112, the second guiding slot 128 and the third guiding slot 130 may be substantial parallel to each other at the first direction or the lengthwise direction L1. In one or more embodiments, the second distal end 134 of the second part 104 includes a second supporting surface 136 opposed to the second clamping portion 126. The second guiding slot 128 and the third guiding slot 130 are positioned between the second connecting end 132 and the second supporting surface 136.

In one or more embodiments, the first clamping portion 110 is integrally formed with the first base 108 and includes a first arm 138 and a second arm 140 opposed to the first arm 138. The first arm 138 and the second arm 140 form a first receiving space 142 to receive a pipe. Further, the first arm 138 includes a first snap ring 144 at one end, and the second arm 140 includes a plurality of first grooves 146. The second arm 140 passes through the first snap ring 144 and the size of the first receiving space 142 may be adjusted via an engagement between one of the first grooves 146 and the first snap ring 144 to adapt pipes with different diameters. Similarly, the second clamping portion 126 is integrally formed with the second base 124 and includes a third arm 148 and a fourth arm 150 opposed to the third arm 148. The third arm 148 and the fourth arm 150 form a second receiving space 152 to receive a pipe. Further, the third arm 148 includes a second snap ring 154 at one end, and the fourth arm 150 has a plurality of grooves 156. The fourth arm 150 passes through the second snap ring 154 and the size of the second receiving slot 152 may be adjusted via an engagement between one of the second grooves 156 and the second snap ring 154 to adapt pipes with different diameters. In one or more embodiments, the first arm 138 and the second arm 140 form a first loop and the third arm 148 and the fourth arm 150 form a second loop. The first arm 138, the second arm 140, the third arm 148 and the fourth arm 150 may be straps. However, it will be understood that there may be an opening between the ends of the first arm 138 and the second arm 140 or an opening between ends of the third arm 148 and the fourth arm 150. The first arm 138, the second arm 140, the third arm 148 and the fourth arm 150 may be made from elastic material such that the pipes may be snapped into the clamping portions via the openings.

In one or more embodiments, the connector 106 includes a rod 158 configured to pass through the first guiding slot 112 and the second guiding slot 128, a first stop 160 and a second stop 162 at two ends of the rod 158. In the depicted embodiment, the first stop 160 and the second stop 162 are cylindrical shape, with a diameter D being greater than a first width W1 of the first guiding slot 112 and a second width W2 of the second guiding slot 128, respectively. It will be understood that the first stop 160 and the second stop 162 may have any suitable shape as long as a size in a width direction D is greater than the first width W1 of the first guiding slot 112 and the second width W2 of the second guiding slot 128, respectively. The first part 102 and the second part 104 are positioned between the first stop 160 and the second stop 162. In one or more embodiments, the rod 158 can move in the first guiding slot 112 and the second guiding slot 128, and the first locking pin 116 can move in the third guiding slot 130 such that the first part 102 may be movable relative to the second part 104 in the first direction L1. That is, the first clamping portion 110 may be movable relative to the second clamping portion 126 in the first direction L1. Further, in one or more embodiments, the length L of the rod 158 is configured to be greater than a sum of a thickness D1 of the first part 102 and a thickness D2 of the second part 104 such that the first part 102 may be movable relative to the second part 104 in the second direction L2. In one or more embodiments, the connector 106 may be bolt and screw. In other embodiments, the connector 106 may be any other suitable structures, for instance, the rod 158 and the first stop 160 may be integrally formed and the second stop 162 may be connected to the rod 158 via any appropriate approaches, such as welding after assembling the first part 102 and the second part 104. The first stop 160 and the second stop 162 may limit a stroke of the first part 102 and the second part 104 in the second direction L2. In one or more embodiments, the length L of the rod 158 of the connector 106 defines a maximum distance of the first part 102 and the second part 104 moving in the second direction L2.

Further, in one or more embodiments, the first base 108 of the first part 102 includes a fourth guiding slot 164 extending in the first direction L1. The second base 124 of the second part 104 further includes a second locking pin 166 extending in the second direction L2. The second locking pin 166 may be received in the fourth guiding slot 164 and slidable in the fourth guiding slot 164. In one or more embodiments, the second locking pin 166 is adjacent to the second distal end 134 of the second base 124. The fourth guiding slot 164 and the first locking pin 166 are positioned at two sides of the first guiding slot 112, respectively. The third guiding slot 130 and the second locking pin 166 are positioned at two sides of the second guiding slot 128, respectively. The engagement of the fourth receiving slot 164 and the second locking pin 166 can further stabilize the connections.

Figure 4:
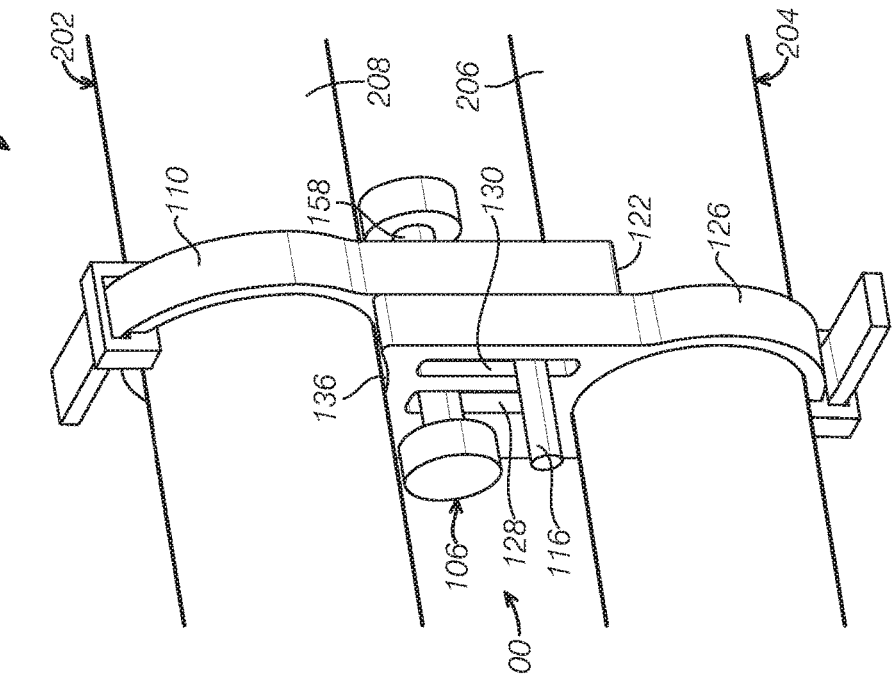
FIG. 4 depicts another view of the pipe assembly in the FIG. 3, illustrating the pipe assembly at a second use position.
Figure 3:
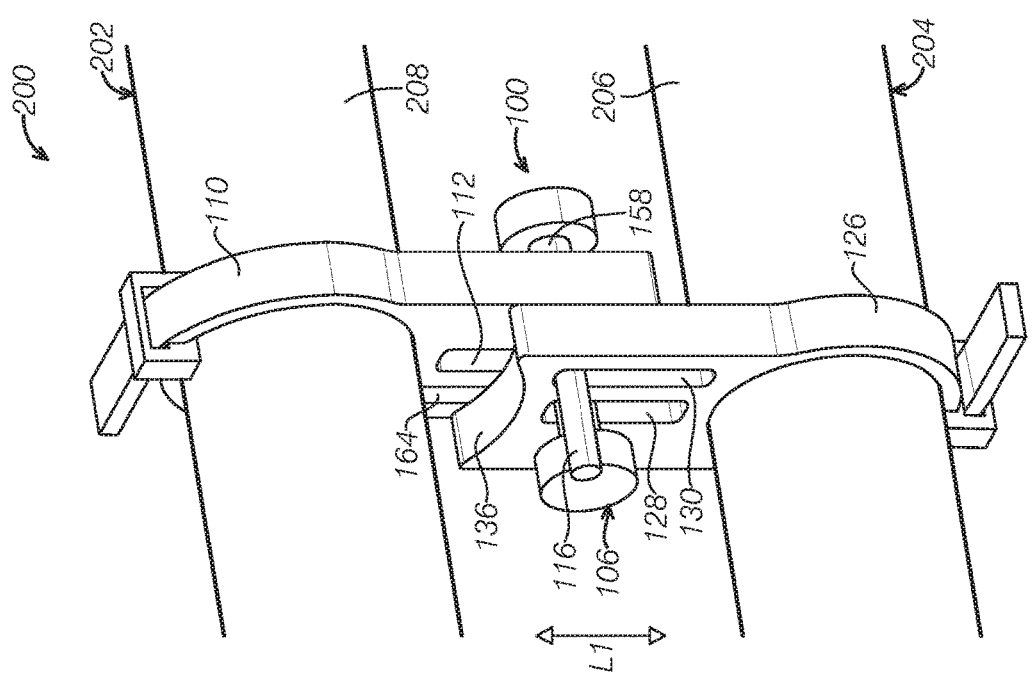
FIG. 3 depicts a perspective view of a pipe assembly including the pipe clamping device in the FIG. 1, illustrating the pipe assembly at a first use position.
Figure 5:
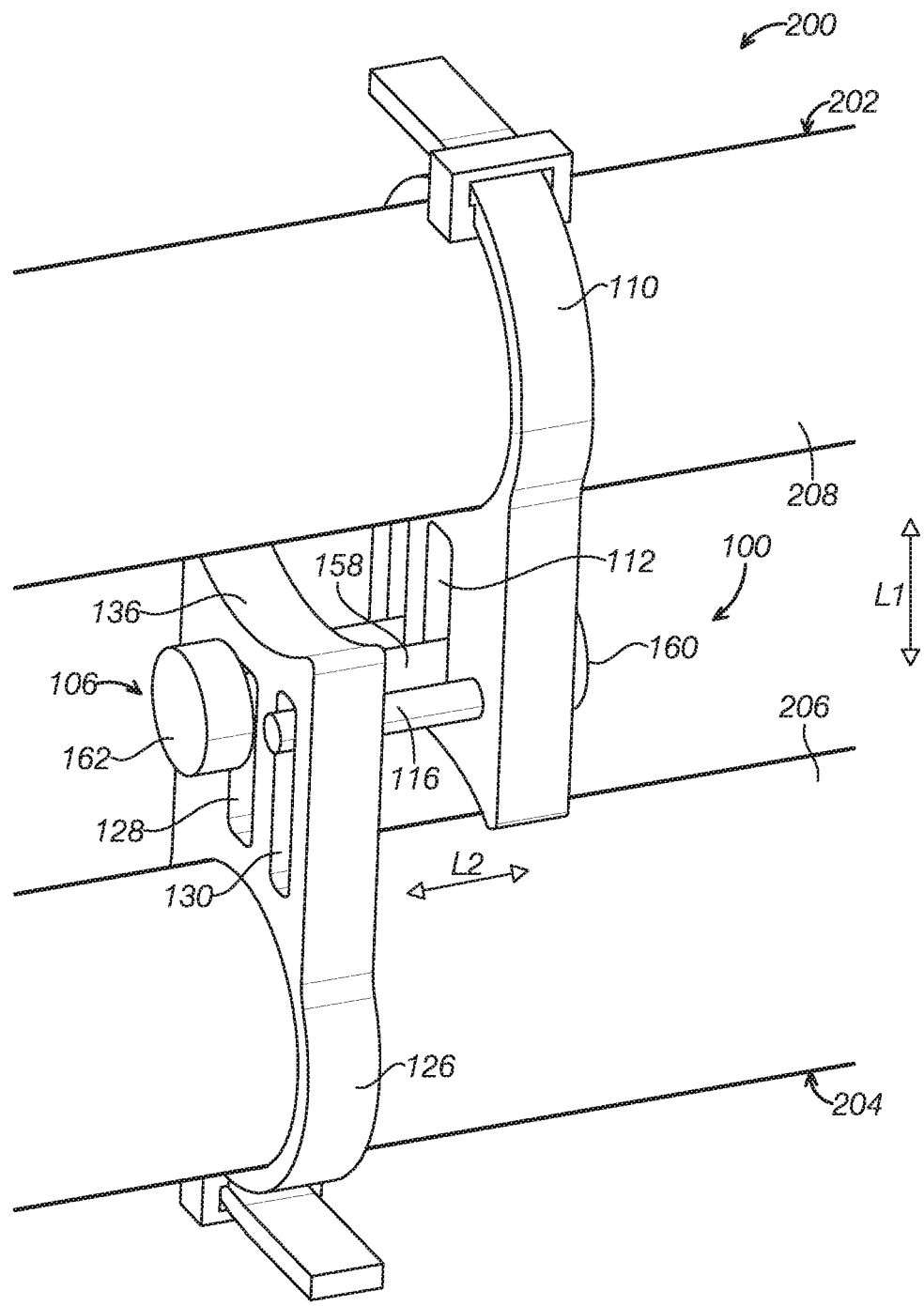
FIG. 5 depicts another view of the pipe assembly in the FIG. 3, illustrating the pipe assembly at a third usage position.

Further referring to FIG. 3-5, FIG. 3 depicts a perspective view of a pipe assembly 200 including the pipe clamping device 100 in FIG. 1, illustrating the pipe assembly 200 at a first use position. The pipe assembly 200 includes a first pipe 200, a second pipe 204 and a pipe clamping device 100 to hold the first pipe 202 and the second pipe 204. In one or more embodiments, the first pipe 202 and the second pipe 204 are held by the first clamping portion 110 of the first part 102 and the second clamping portion 126 of the second part 104, respectively. At the first use position shown in FIG. 3, the first locking pin 116 of the part 102 contacts an end such as an upper end of the third guiding slot 130 to prevent further movement of the first part 102 and the second part 104 in the first direction L1 away from the second pipe 204 such that the first clamping portion 110 and the second clamping portion 126 are limited to a distance in the first direction L1. That is, the first pipe 202 and the second pipe 204 are spaced at a maximum distance in the first direction L1 at the first use position.

FIG. 4 depicts another of the pipe assembly 200, illustrating the pipe assembly 200 at a second use position. At the second use position, the first supporting surface 122 of the first base 108 contacts an outer surface 206 of the second pipe 204 and the second supporting surface 136 of the second base 124 contacts an outer surface 208 of the first pipe 202 such that the first clamping portion 110 and the second clamping portion 126 are spaced at a minimum distance in the first direction L1. That is, the first pipe 202 and the second pipe 204 are spaced at the minimum distance at the second use position at the second use position. In one or more embodiments, the first supporting surface 122 of the first part 102 is concaved to accommodate the outer surface 206 of the second pipe 204 and the second supporting surface 136 of the second part 104 is concaved to accommodate the outer surface 208 of the first pipe 202. In this way, the first pipe 202 and the second pipe 204 are more stable at the second use position. In the depicted embodiment, a minimum length of the first base 108 and a minimum length of the second base 124 in the first direction L1 define the minimum distance between the first pipe 202 and the second pipe 204. In other embodiments, a length of the third receiving slot 130 in the first direction L1 and a position of the first locking pin 116 on the first base 108 may be configured such that the first locking pin 116 may contact another end such as a lower end of the third guiding slot 130 before the first supporting surface 122 contact the outer surface 206 of the second pipe 204.

FIG. 5 depicts another view of the pipe assembly 200, illustrating the pipe assembly 200 at a third use position. In one or more embodiments, the first base 108 of the first part 102 and the second base 124 of the second part 104 contact the first stop 160 and the second stop 162 of the connector 106, respectively to be locked in the second direction L2. At the third use position, a distance between the first clamping portion 110 of the first part 102 and the second clamping portion 126 of the second part 104 is maximum. That is, the maximum distance exists between the first pipe 202 and the second pipe 204 in the second direction L2 at the third use position. Referring back to FIG. 3-4, at the first use position and the second use position, the distance between the first clamping portion 110 of the first part 102 and the second clamping portion 126 of the second part 104 is minimum. The length L of the rod 158 of the connector 106 may be configured such that the first clamping portion 110 of the first part 102 and the second clamping portion 126 of the second part 104 may be movable in the second direction L2. In one or more embodiments, the distance between the first clamping portion 110 of the first part 102 and the second clamping portion 126 of the second part 104 may be about zero.

Further, in one or more embodiments, the width W1 of the first guiding slot 112 and the width W2 of the second guiding slot 128 may be configured to be greater than a diameter D2 of the rod 158 of the connector 106, respectively, such that the connector 106 can move in the direction L3. The width W3 of the third guiding slot 130 and the width W4 the fourth guiding slot 164 may be configured to be greater than a width W5 of the first locking pin 116 and a width W6 of the second locking pin 166, respectively such that the first locking pin 116 and the second locking pin 166 connector is movable in the third direction L3. The third direction L3 may be substantially perpendicular to the first direction L1 and the second direction L2. Thus, the pipe clamping device 100 may allow two pipes to move in three directions to meet mounting requirements while reduce or eliminate an impact of the vibration.

Figure 6:
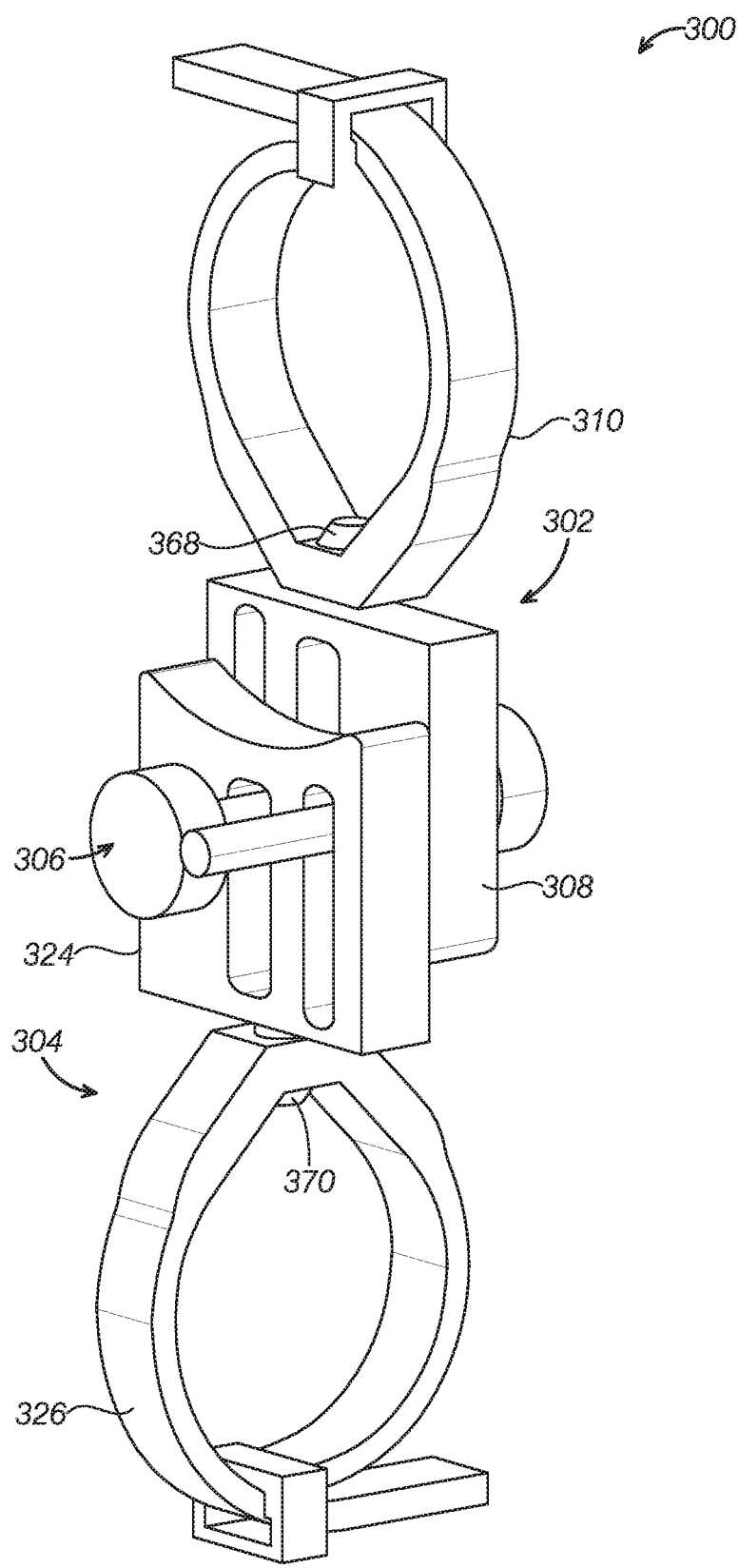
FIG. 6 depicts a perspective view of a pipe clamping device according to another embodiment of the present disclosure.

Referring to FIG. 6, FIG. 6 depicts a perspective view of a pipe clamping device 300 according to another embodiment of the present disclosure. For the sake of brevity, the same or similar parts will be described in detail or described briefly. In one or more embodiments, the pipe clamping device 300 includes a first part 302, a second part 304 and a connector 306 to connect the first part 302 and the second part 304. The first part 302 includes a first base 308 and a first clamping portion 310 connected to the first base 308. The second part 304 includes a second base 324 and a second clamping portion 326 connected to the second base 324. The pipe clamping device 300 in the FIG. 6 is similar to the pipe clamping device 100 in the FIG. 1, and a difference is that the first base 308 is connected to the first clamping portion 310 via a first pivotal structure 368, and the second base 324 is connected to the second clamping portion 326 via a second pivotal structure 370.

Figure 7:
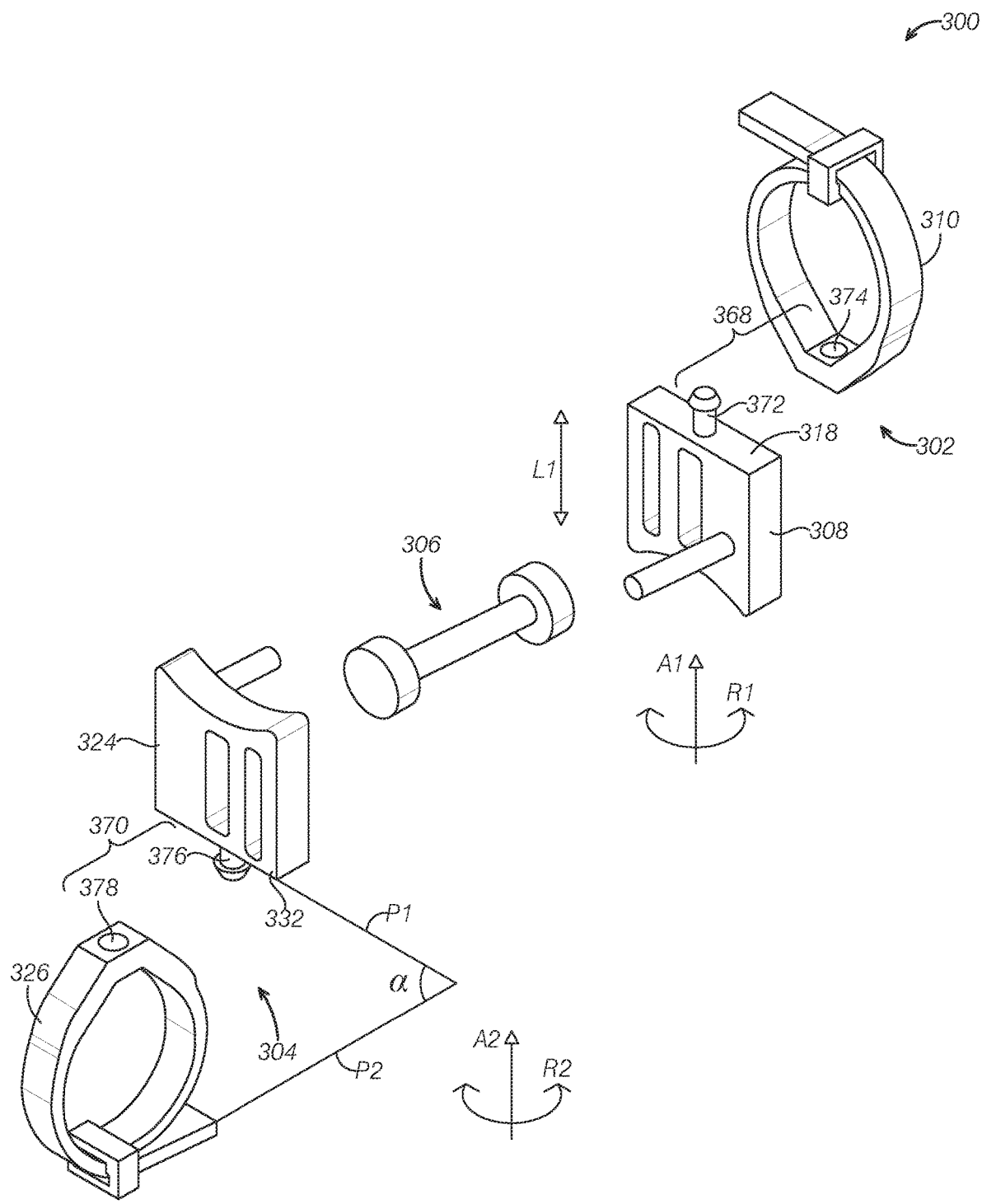
FIG. 7 depicts an exploded perspective view of the pipe clamping device in the FIG. 6.

Further referring to FIG. 7, FIG. 7 depicts an exploded perspective view of the pipe clamping device 300. The first pivotal structure 368 includes a first pivotal shaft 372 extending from a first connecting end 318 of the first base 308 in the first direction L1 and a first opening 374 positioned on the first clamping portion 310. The second pivotal structure 370 includes a second pivotal shaft 376 extending from a connecting end 332 of the second base 324 in the first direction L1 and a second opening 378 positioned on the second clamping portion 326. That is, the first clamping portion 310 is rotatable relative to the first base 308 in a third direction R1 around a first axis A1 parallel to the first direction L1, and the second clamping portion 326 is rotatable relative to the second base 324 in a fourth direction R2 around a second axis A2 parallel to the first direction L2. For example, a plane P1 in which the first clamping portion 324 lies has an angle α relative to a plane P2 in which the second base 326 lies via pivotal movement.

Figure 8:
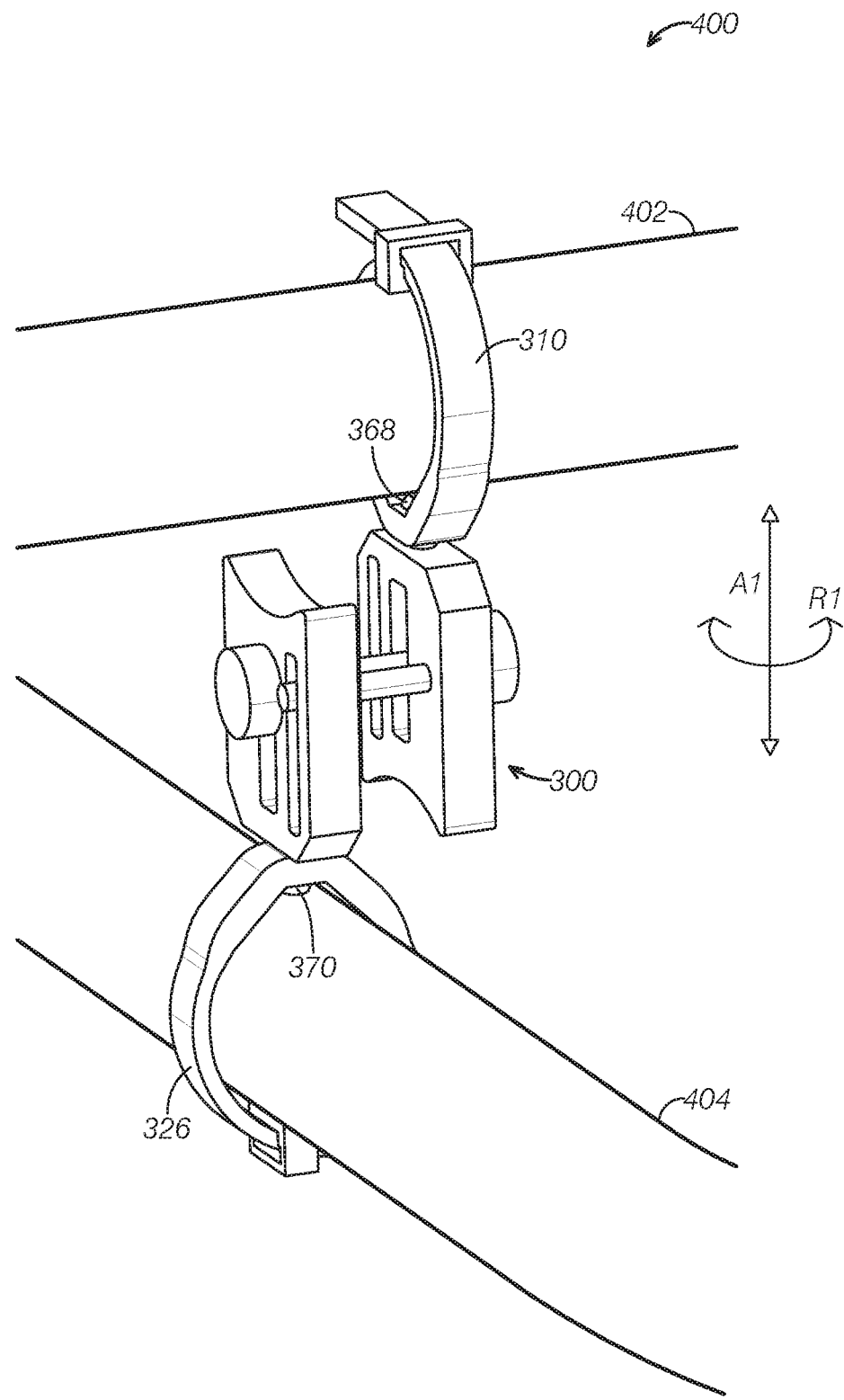
FIG. 8 depicts a perspective view of a pipe assembly including the pipe clamping device in FIG. 6.

Further referring to FIG. 8, FIG. 8 depicts a perspective view of a pipe assembly 400 including the pipe clamping device 300 in FIG. 6. The pipe assembly 400 includes a first pipe 402, a second pipe 404 and a pipe clamping device 300 to connect the first pipe 402 and the second pipe 404. In one or more embodiments, the first pipe 402 and the second pipe 404 are held in the first clamping portion 310 of the first part 302 and the second clamping portion 326 of the second part 304, respectively. Further, due to the first pivotal structure 368 and the second pivotal structure 370, the first clamping portion 310 and the second clamping portion 326 may rotate about the first pivotal shaft 372 and the second pivotal shaft 376 relative to the first base 308 and the second bae 324, respectively, thus rotate about a rotary direction R1 and R2. Accordingly, the first pipe 402 may rotate relative to the second pipe 404 to further increase a freedom of movement of the first pipe 402 and the second pipe 404. Further, as illustrated in FIG. 8, the pipe clamping device 300 may be utilized to connect pipes with various angles.

While the present invention has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Those skilled in the art will understand that the disclosed examples may be varied, modified, and altered without departing from the scope of the inventions described herein.

The invention claimed is:

1. A pipe clamping device, comprising:
a first part including a first base and a first clamping portion connected to the first base, wherein the first base includes a first guiding slot extending in a first direction;
a second part including a second base and a second clamping portion connected to the second base, wherein the second base includes a second guiding slot extending in the first direction; and
a connector including a rod passing through the first and second guiding slots at a second direction different from the first direction;
wherein the first clamping portion is movable relative to the second clamping portion in the first and second directions; and
wherein the first guiding slot and the second guiding slot are positioned between the first clamping portion and the second clamping portion, and the first clamping portion is positioned outside the second clamping portion.

2. The pipe clamping device of the claim 1, wherein the first base further includes a first locking pin extending from a main surface of the first base in the second direction and the second base further includes a third guiding slot to receive the first locking pin and the third guiding slot is substantially parallel to the second guiding slot.

3. The pipe clamping device of the claim 2, wherein the first base includes a first connecting end to the first clamping portion and a first distal end opposed to the first connecting end, and the first distal end further includes a first supporting surface, wherein the first guiding slot is positioned between the first connecting end and the first supporting surface, and the first locking pin is adjacent to the first distal end, and wherein the first direction is substantially perpendicular to the second direction.

4. The pipe clamping device of the claim 3, wherein the second base includes a second connecting end and a second distal end opposed to the second connecting end, wherein the second distal end of the second base further includes a second supporting surface, and wherein the second guiding slot and the third guiding slot are positioned between the second distal end and the second connecting end.

5. The pipe clamping device of the claim 4, wherein the first supporting surface and the second supporting surface are concaved to accommodate an outer surface of a first pipe and a second pipe to be connected.

6. The pipe clamping device of the claim 5, wherein the connector further includes a first stop and a second stop located at two ends of the rod, and the first part and the second part are disposed between the first stop and the second stop.

7. The pipe clamping device of the claim 6, wherein a length of the rod is greater than a sum of a thickness of the first base and a thickness of the second base in the second direction such that the first part is movable relative to the second part in the second direction.

8. The pipe clamping device of the claim 7, wherein the connector includes a blot and a screw.

9. The pipe clamping device of the claim 8, wherein the first base of the first part further includes a fourth guiding slot extending in the first direction, the second base of the second part further includes a second locking pin extending from a main surface of the second base in the second direction, and wherein the second locking pin is slidable in the fourth guiding slot, and the second locking pin is adjacent to the second distal end of the second base.

10. The pipe clamping device of the claim 9, wherein the fourth guiding slot and the first locking pin are disposed at two sides of the first guiding slot, respectively, and the third guiding slot and the second locking pin are disposed at two sides of the second guiding slot, respectively.

11. The pipe clamping device of the claim 1, wherein the first clamping portion is integrally formed with the first base, includes a first arm and a second arm opposed to the first arm, and the first arm and the second arm form a first receiving space to receive a first pipe, and wherein the second clamping portion is integrally formed with the second base, includes a third arm and a fourth arm opposed to the third arm, and the third arm and the fourth arm form a second receiving space to receive a second pipe.

12. The pipe clamping device of the claim 11, wherein an end of the first arm includes a first snap ring, the second arm includes a plurality of first grooves, and the second arm passes through the first snap ring such that a size of the first receiving space may be adjusted via an engagement between the first snap ring and one of the plurality of first grooves.

13. The pipe clamping device of the claim 1, wherein the first clamping portion is connected to the first base via a first pivotal structure such that the first clamping portion is rotatable relative to the first base in a third direction around a first axis parallel to the first direction, wherein the second clamping portion is connected to the second base via a second pivotal structure such that the second clamping portion is rotatable relative to the second base in the third direction around a second axis parallel to the first direction.

14. A pipe clamping device, comprising:
a first part including a first base and a first clamping portion connected to the first base and configured to receive a first pipe, wherein the first base includes a first guiding slot extending in a first direction and a first locking pin extending from a main surface of the first base in a second direction substantially perpendicular to the first direction and adjacent to a first distal end of the first base;

a second part including a second base and a second clamping portion connected to the second base and configured to receive a second pipe, wherein the second base includes a second guiding slot extending in the first direction and a third guiding slot to slidably receive the first locking pin; and a connector including a rod and a first stop and a second stop that are disposed at two ends of the rod, wherein the rod passes through the first guiding slot and the second guiding slot;

wherein the first and second and third guiding slots are substantial parallel each other, wherein the first clamping portion and the second clamping portion are spaced apart from each other at the first direction, the first base and the second base are at least partially overlapped, and wherein a length of the rod defines a maximum distance between the first clamping portion and the second clamping portion in the second direction.

15. The pipe clamping device of the claim 14, wherein the first base further includes a fourth guiding slot extending in the first direction, and the second base further includes a second locking pin extending in the second direction, and wherein the second locking pin is adjacent to a second distal end of the second base and slidably received in the fourth guiding slot.

16. The pipe clamping device of the claim 14, wherein a plane in which the first base lies is parallel to or overlapped with a plane in which the first clamping portion lies, a plane in which the second base lies is parallel to or overlapped with a plane in which the second clamping portion lies, and where each of the first part and the second part is integrally formed as one piece.

17. The pipe clamping device of the claim 14, wherein the first clamping portion is connected to the first base via a first pivotal structure such that a plane in which the first clamping portion lies has a first angle relative to a plane in which the first base via pivotal movement, and the second clamping portion is connected to the second base via a second pivotal structure such that a plane in which the second clamping portion lies has a second angle relative to a plane in which the second base via pivotal movement.

18. A pipe assembly, comprising:
a first pipe;
a second pipe;
a clamping device to connect the first pipe with the second pipe, the clamping device comprising:
a first part including a first base having a first connecting end and a first distal end and a first clamping portion connected to the first connecting end to receive the first pipe; wherein the first base includes a first guiding slot extending in a first direction and a first locking pin extending from a main surface of the first base in a second direction different from the first direction and adjacent to the first distal end of the first base;

a second part including a second base having a second connecting end and a second distal end, and a second clamping portion connected to the second connecting end of the second base to receive the second pipe, wherein the second base includes a second guiding slot extending in the first direction and a third guiding slot to slidably receive the first locking pin; and a connector to connect the first part with the second part, wherein the connector includes a rod passing through the first guiding slot and the second guiding slot, and a first stop and a second stop that are disposed at two ends of the rod, wherein the first part and the second part are movable along the rod of the connector to enable movement of the first pipe relative to the second pipe in the second direction, and movement of the first locking pin in the third guiding slot enables movement of the first pipe relative to the second pipe in the first direction.

19. The pipe assembly of the claim 18, wherein the first base further includes a fourth guiding slot extending in the first direction, the second base further includes a second locking pin extending in the second direction, wherein the second locking pin is adjacent to the second distal end of the second base and slidably received in the fourth guiding slot, and wherein the first direction is substantial perpendicular to the second direction.

20. The pipe assembly of the claim 19, wherein the first distal end of the first base includes a first supporting surface concaved to accommodate an outer surface of the second pipe, and the second distal end of the second base includes a second supporting surface concaved to accommodate an outer surface of the first pipe.

* * * * *